UNITED STATES PATENT OFFICE.

RUELUFF D. HALEY, OF TERRE HAUTE, INDIANA.

EYE REMEDY.

SPECIFICATION forming part of Letters Patent No. 318,468, dated May 26, 1885.

Application filed March 19, 1885. (No specimens.)

*To all whom it may concern:*

Be it known that I, RUELUFF D. HALEY, a citizen of the United States, residing at Terre Haute, in the county of Vigo and State of Indiana, have invented a new and useful Composition of Matter or Collyrium to be used for Diseased Eyes, of which the following is the specification.

My composition consists of the following ingredients combined in the proportions stated, viz: sulphate of copper, two ounces; pure saltpeter, two ounces; fine dairy-salt, two ounces; stick-brimstone, two drams. This matter is to be thoroughly pulverized together, bottled, and corked tight, and after being allowed to stand for three days the compound should be baked or burned over a slow fire until it takes the color of gold, after which it should be rebottled, corked tight, and allowed to stand for three days and nights. To three hundred and fifty grains of this compound add as follows: sulphate of zinc, one hundred and twenty grains; corrosive sublimate, six grains; crushed or loaf sugar, one and one-half ounce; pure rain-water, fifty-three ounces. These ingredients are to be thoroughly mingled by agitation, and after being allowed to stand twelve hours and run through a fine strainer the compound will be ready for use, a sufficient quantity of which, to engage with the diseased parts of the eyes, should be well applied under the upper and lower lids of the organ every morning for ulcerated cornea, opacity, or inflammation of the cornea, inflammation of the scleratic, or any other inflammation of the eye.

What I claim, and desire to secure by Letters Patent of the United States, is—

The herein-described composition of matter to be used for the cure of diseased eyes, consisting of sulphate of copper, saltpeter, dairy-salt, and stick-brimstone, combined and mixed with sulphate of zinc, corrosive sublimate, crushed or loaf sugar, and water in the proportions specified.

In testimony whereof I affix my signature in presence of two witnesses.

RUELUFF D. HALEY.

Witnesses:
CAREY J. SINCLAIR,
WILLIAM P. SANFORD.